United States Patent [19]

Barry

[11] Patent Number: 4,946,328

[45] Date of Patent: Aug. 7, 1990

[54] SWINGING-LINK ROTARY LOADERS

[76] Inventor: Leonard D. Barry, 19300 Pennington, Detroit, Mich. 48221

[21] Appl. No.: 234,476

[22] Filed: Aug. 22, 1988

[51] Int. Cl.$^5$ .............................................. B65G 67/02
[52] U.S. Cl. .................................. 414/334; 294/81.62; 294/104; 414/337; 414/338; 414/392; 414/401; 414/917
[58] Field of Search ............... 414/334, 337, 338, 340, 414/344, 399, 390–392, 401, 584, 917, 744.2, 744.3, 744.5, 744.6, 744.7, 744.8; 294/81.62, 104; 104/20, 21, 28–31, 49

[56] References Cited

U.S. PATENT DOCUMENTS

| | | | |
|---|---|---|---|
| 3,061,118 | 10/1962 | Halberstadt | 414/917 X |
| 4,124,129 | 11/1978 | Barry | 414/337 X |
| 4,362,456 | 12/1982 | Barry | 414/337 X |
| 4,370,085 | 1/1983 | Barry | 414/337 |
| 4,370,086 | 1/1983 | Barry | 414/337 |
| 4,483,652 | 11/1984 | Barry | 414/392 |
| 4,519,737 | 5/1985 | Barry | 414/337 |
| 4,666,364 | 5/1987 | Doege et al. | 414/917 X |
| 4,674,944 | 6/1987 | Addleman | 414/917 X |

FOREIGN PATENT DOCUMENTS 1044573  9/1983  U.S.S.R. ................ 414/391

Primary Examiner—David A. Bucci

[57] ABSTRACT

These loaders for transfer of cargo containers or semi-trailers to and from railway cars etc. have parallel swinging links vertically connecting the load-spreader support end of the lift arm with the end of the arm which is mounted to a pivot. The links are free to swing back when the loadspreader engages a vehicle to cushion and carry the load-spreader aligned with the vehicle for transfer across the chord of a transfer arc. A weight extends the links out at the bottom to extend the loadspreader to swing back through vertical for least change in elevation. The load arm is supported on wheels to run on the cam track at or near the same elevation that is mounted to swing up and down on the mount about the pivot, so the cam track wheels run on a substantially uniform radius from the pivot. The inner end of the arm extends up to support the top ends of the swinging links which depend to support the outer end of the arm or vice versa. The loader for transfer of semitrailers or containers is further provided with an improved underreaching loadspreader which when being moved under the trailer is extended lengthwise the trailer by an engagement with the side edge of the semitrailer to reach the lift pads on the far side of the semitrailer. Swinging links also apply to parallel rotating-arms loaders and those having overhead loadspreaders.

8 Claims, 2 Drawing Sheets

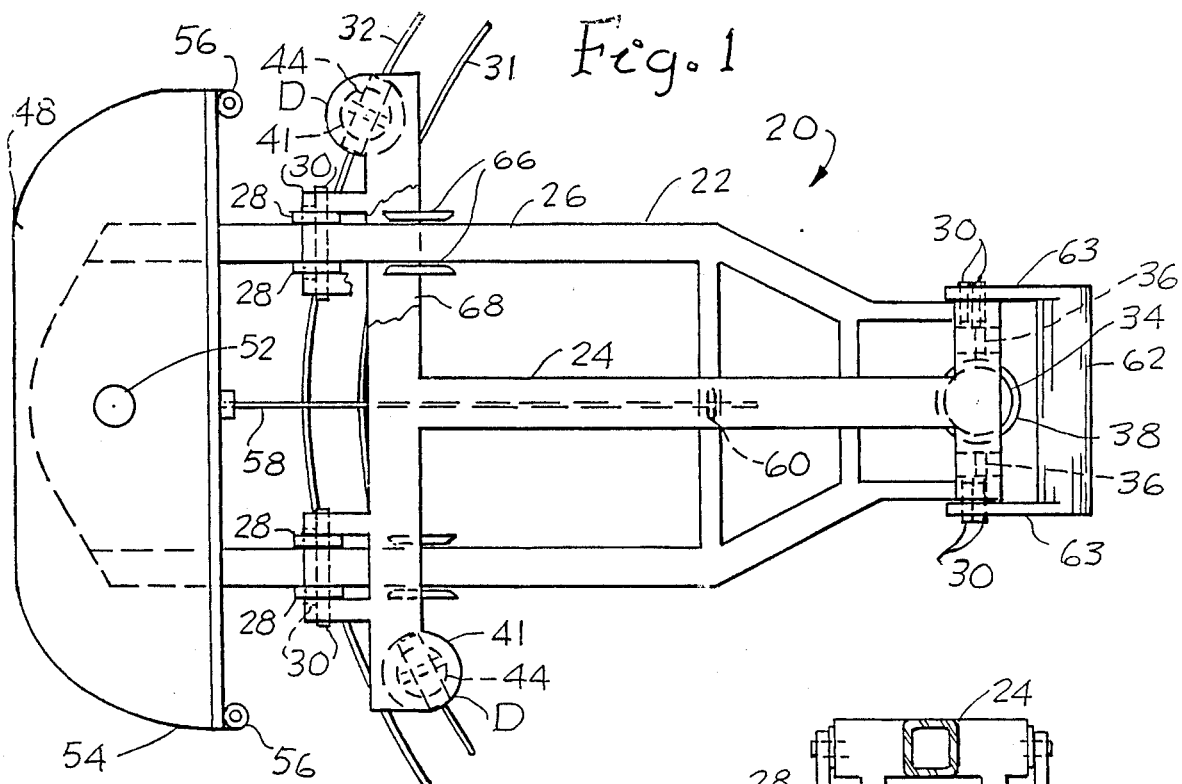
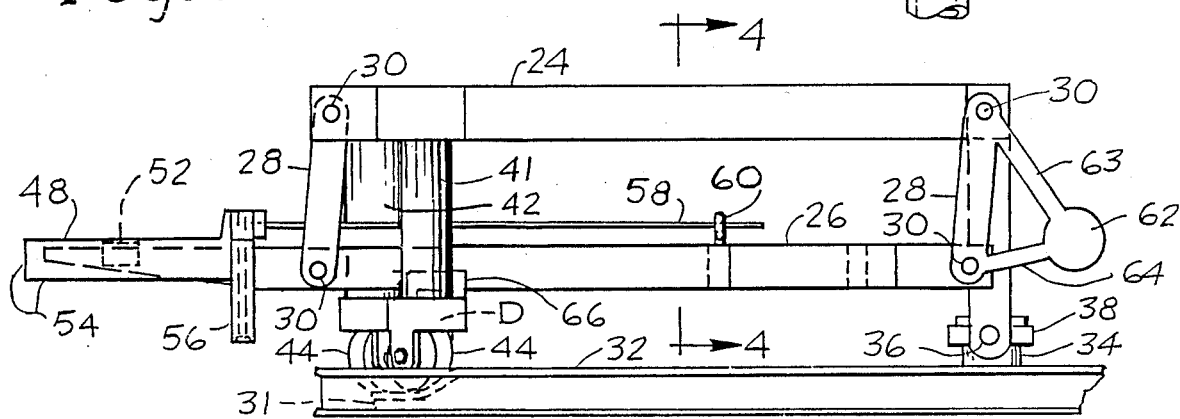
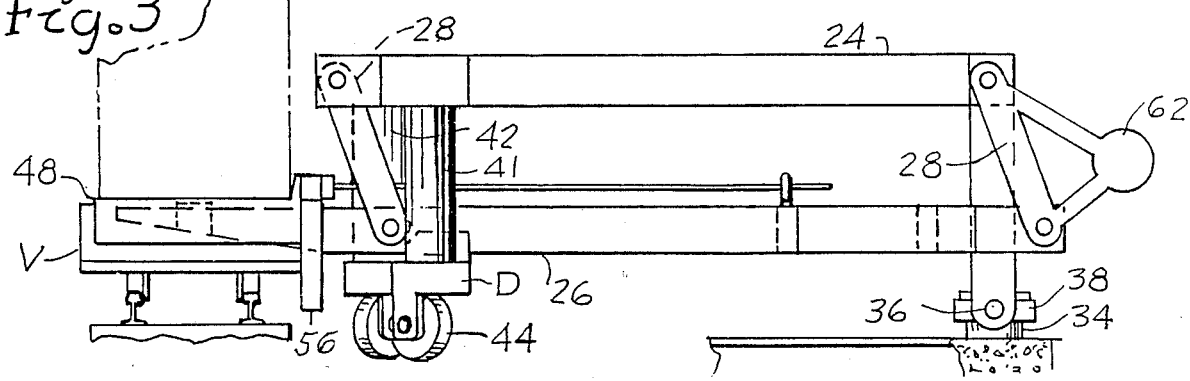

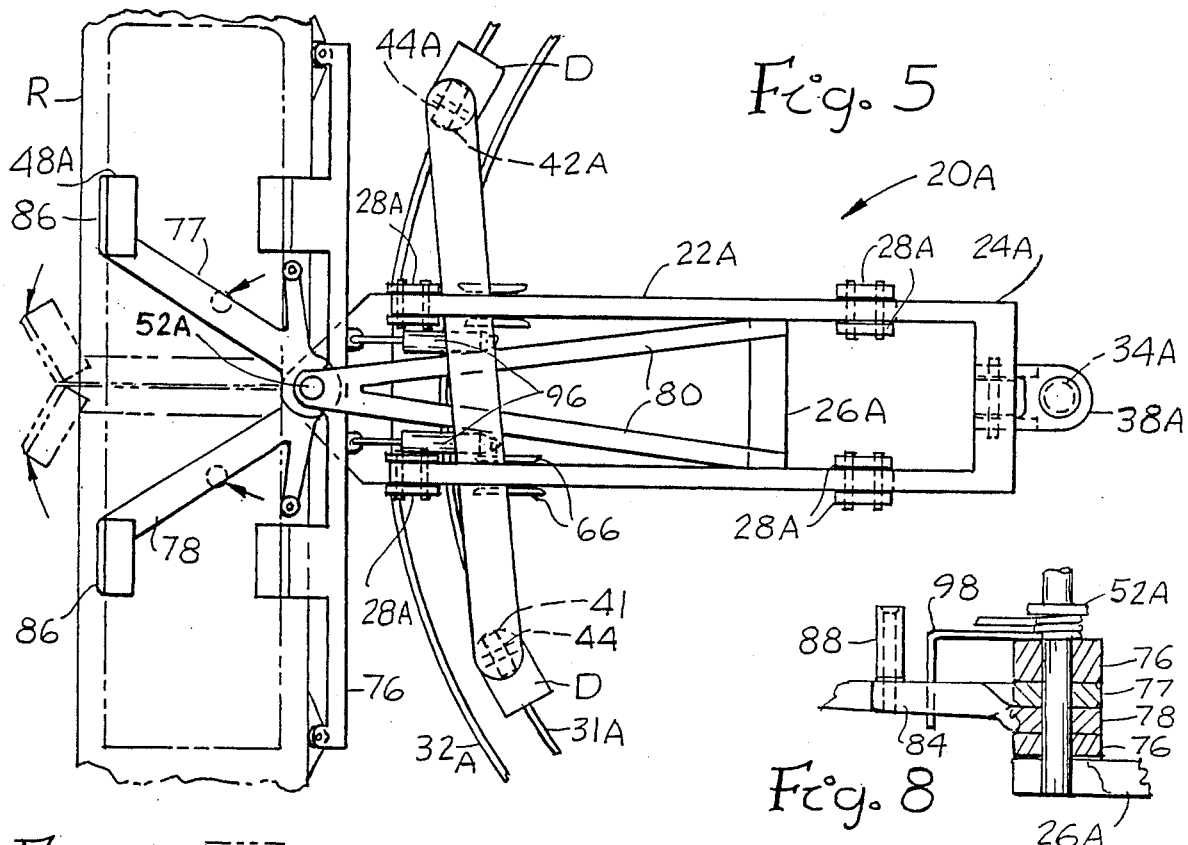
Fig. 5
Fig. 8
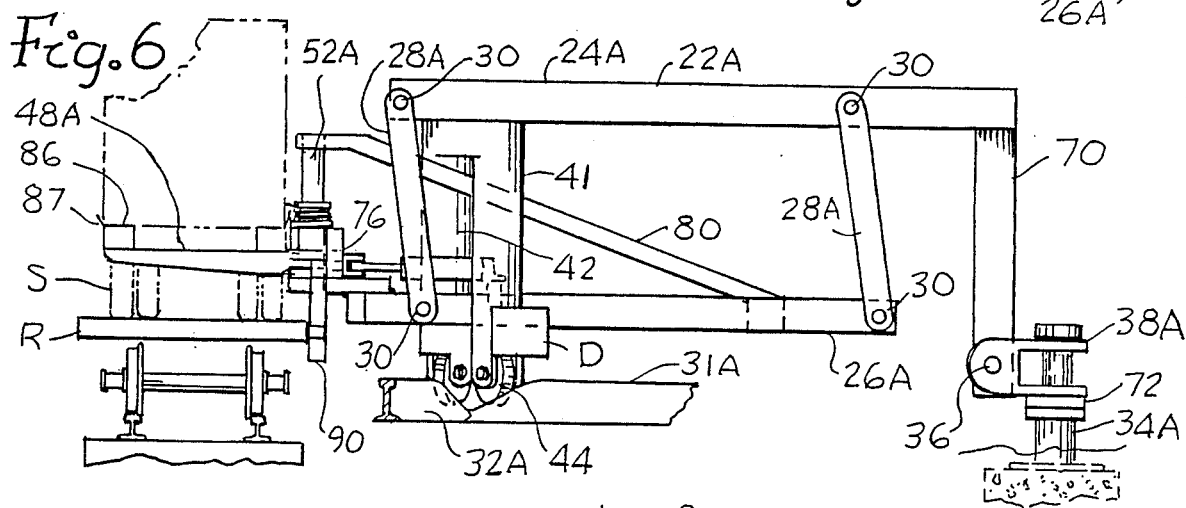
Fig. 6
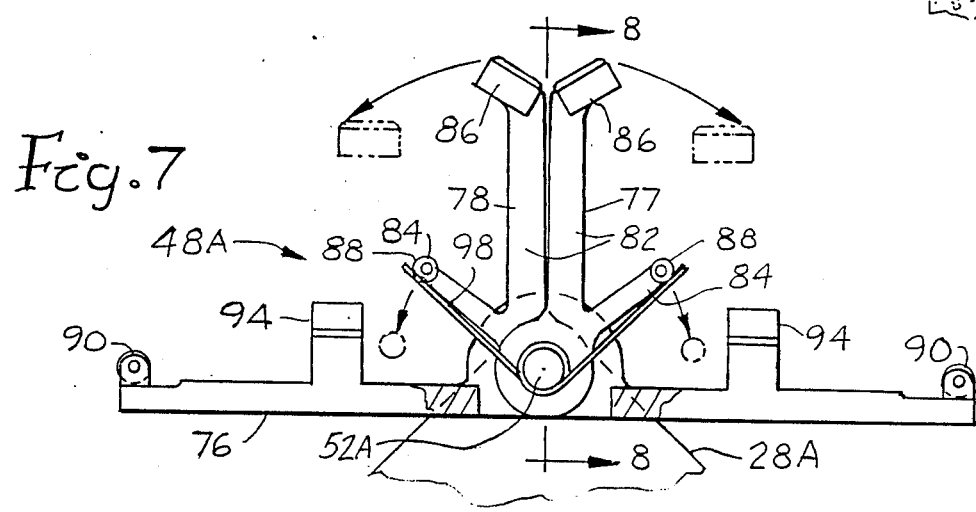
Fig. 7

SWINGING-LINK ROTARY LOADERS

CROSS REFERENCE TO RELATED PATENTS

This invention relates to my U.S. Pat. Nos. 4,746,257; 4,519,737; 4,483,652; 4,370,085; 4,370,086; 4,362,456; and 4,124,129 as an improvement thereover.

The rotary loaders in these patents have the load lift platform or loadspeaker mounted on one or more rotary lift arms to rotate in an arc or the chord of an arc over a vehicle to align for transfer of a cargo container or trailer. In these earlier patents the loadspreader was mounted to gage on the vehicle and telescope or slide inward to follow the chord of the transfer arc to be in exact alignment through transfer. In some of these patents the load spreader is mounted as a turntable to turn to follow alignment through the arc and is cushioned by the turntable pivot pin being mounted in a slot so that the loadspreader can be slid back to follow the chord of the arc against spring pressure. The spring must be substantial to force the turntable back out under heavy load and accompanying friction after the loader passes the point of tangency in its transfer arc, ie. the mid-point of the chord of the transfer arc. This spring is so strong it tends to turn the car up on the side that the loader is pushing on the car.

In some of these patents the load arm is telescoping to cushion the loadspreader with spring pressure against a vehicle to follow the chord of the transfer arc as the load arm is turned in an arc. This also would have excessive friction under load and dangerous pressure against the vehicle even if rollers are used to reduce friction.

It has therefore been my effort to find a better way and so developed the loader arm shown in my U.S. Pat. No. 4,746,257, FIGS. 23-25, where two parallelogram linkages are connected in series between the pivot post and loadspreader and peaked between them to collapse up against the restoring force of gravity as the outer end of the arm rolls on a radial track arm, a very complex linkage to solve the problem which my present invention solves simply and with broad application for the rotary loaders.

It is therefor an object of this invention to provide a rotary loader having an improved mounting for its loadspreader to eliminate the problem of friction and excessive pressure when cushioning the loadspreader against the side of a vehicle to align for transfer over the chord of the transfer arc. It is a further object to provide swinging linkage to support the loadspreader and to use it over the portion of an arc which gives least vertical movement, since I have found that the vertical movement can be kept within acceptable tolerances.

It is a further object to provide rub rails and/or rollers between the inner and outer frames of the arm so the driving force at the wheels of the loader can be transmitted to the loadspreader without following through the linkage, to reduce the weight of the structure of the loader used to move a cut of railway cars to index them during transfer.

It is an object to provide a weight to extend the linkage forward to increase the force of the loadspreader against the vehicle to align better under friction especially when empty and to utilize the swing of the links through vertical position where they give least change in elevation to the loadspreader.

With the links suspended from above, the inner suspending portion of the load arm may be high above the supporting cam track wheels. It is therefore an object to extend the inner arm down to the pivot connection to the pivot post to be at the average height of the cam track rails to reduce the variation of the wheels' radial distance from the pivot post and the tilting of the wheels.

These, other, and further objects may be pointed out in the specification or should become apparent to those skilled in the art by study of this specification with reference to the drawings wherein:

FIG. 1 is a plan view of the preferred single-arm rotary loader with swinging-parallel-links load arm.

FIGS. 2 and 3 are side elevations of the loader of FIG. 1 in respectively extended position and when fully engaged with a vehicle.

FIG. 4 is a section along lines 4—4 of FIG. 2.

FIG. 5 is a plan view of a swinging-parallel-link loader for semitrailers or containers engaged with a railway car.

FIG. 6 is a side elevation of the loader in FIG. 5 engaging the car.

FIG. 7 is a plan view of the loadspreader for the loader of FIG. 5 with a portion cut away to better show the pivot pocket.

FIG. 8 is a vertical sectional view taken on line 8—8 of FIG. 7.

Referring to the drawings and in particular to FIGS. 1-4, rotary loader 20 has a load lift arm 22 including an inner arm frame 24 and an outer reaching arm frame 26 connected on swinging links 28 with pins 30. The loader has two circular cam tracks 31 and 32 substantially concentric about a vertical pivot post 34. The inner end of the inner arm frame is pivotally connected at 36 to a collar 38 to revolve about the pivot post and swing up and down on pin 36. The outer end of frame 24 has two legs 41 and 42 each with a wheel 44 and spaced so leg 41 runs on cam track 31, and 42 runs on track 32, at the same spacing as transfer slopes in the cam track to lift and lower the outer end of the inner frame 24 equally as the arm is revolved about the pivot post.

As seen in elevation, FIG. 4, frame 24 is a bridge from which parallel links 28 suspend the outer frame 26. At the outer end of frame 26 is mounted a loadspreader, turntable 48. The loadspreader is a platform with pivot pin 52 about which it can rotate horizontally as in my U.S. Pat. No. 4,370,086. Platform 48 has an outer depending apron 54 for keying between end ledges on vehicle V and end locating rollers 56 which roll against the side edge of the vehicle to align the platform with the vehicle. A straight spring rod 58 is secured fixed to platform 48 on center and extends straight back through an eye 60 on the outer frame 26 to align the platform substantially at right angles to arm 22 when not engaging a vehicle and to deflect as the loader is engaged and disengaged from the vehicle rotating the turntable several degrees.

Optionally a weight 62 is suspended off back from one or more links 28 by members 63 and 64 to tilt links 28 out at the bottom, FIG. 2, so when the loader is fully engaged with a vehicle. FIG. 3, the links have traveled through vertical position where least vertical variation of the height of platform 48 is achieved with required in and out movement of outer arm frame 26 relative to the inner arm frame 24. Links 28 will swing to near vertical position under heavy load when free of the vehicle but should still extend the load over the vehicle with enough cushioning travel back from the path of vehicle V to insure alignment. Weight 62 helps most when there is no load on the loadspreader.

Each wheel 44 would be driven by drive D to move a cut of railway cars V as it transfers a load and aligns the next car or berth for engagement for the next transfer. Coupling platform 54 will couple a car over about a 17' tolerance zone full scale. Four scuff bars 66 secured on a lower cross-member 68 of frame 24 are positioned to guide frame 26 against heavy driving forces.

Further details and operation of the loaders are given in my reference patents.

Refer to FIGS. 5-8 for some variations of the loader. Similar parts are given the same number or a suffix added to indicate some difference.

Loader 20A has arm 22A modified to support loadspreader 48A for handling semitrailers S or containers. Arm 22 has an inner frame 24A with pivot-end vertical member 70 depending to pin 36 on clevis 38A mounted to turn around post 34A. A washer 72 on the post can be removed and replaced by a second clevis 38A to mount a second loader to also operate about the same pivot, etc. The outer frame 26A is supported on long links 28 from frame 24A to swing with only a slight lift to the load during alignment.

The load spreader 48A has three support members 76, 77, and 78. Members 77 and 78 are fitted to turn in a slot in member 76 and all mounted to rotate on a vertical post 52A supported by frame 26A with bracing 80. Members 77 and 78 respectively each have a load arm 82 and an operating arm 84 extending radially from post 52A. Each load arm has a chair 86 for aligning under the lift pad on far side of the bottom of the piggy-back trailer. Each chair is integral on outer end of a lift arm and has a back 87 to hold the trailer in place. Operating arm 84 has an upstanding roller 88 to engage the side of the trailer to turn the connected load arm from straight out position where it clears under the central portion of the trailer and is swung endward and back under the trailer as the roller 88 is pushed against the trailer by movement of the loader in an arc over the path of the trailer. In FIG. 5 the engaged position of the loadspreader is shown with solid lines and the disengaged position shown in phantom. Member 76 extends along the side of the car or along a coupling runner along a driveway for the trailer and has a depending coupling roller 90 at each end for engaging in latch pockets as described in my U.S. Pat. No. 4,746,257 and has tabs or chairs 94 extending out to engage under the bottom lift pads along the side of the trailer facing the loader. Spring cylinders 96 connected between frame 26A and member 76 hold member 76 at right angles to arm 22A to yield as member 76 is turned to align against a car or coupling runner. Coil spring 98 around post 52A has ends connected between arms 84 to extend arms 82 straight out as shown in phantom in FIG. 5 with only enough pressure to do that when the loadspreader is empty. Air cylinders can be substituted for the spring cylinders to give constant pressure.

Having thus described two of my loaders with the swinging links it is understood that rotary loaders with various loadspreaders can be improved by using swinging links, including loaders with two rotary load arms supporting the load spreader. I therefore do not wish to be limited to those disclosed herein but desire to cover the full application of the invention with the appended claims.

I claim as my invention:

1. In a rotary loader having at least one loadspreader activated to engage against the side of a vehicle to move for aligning the loadspreader with the vehicle when moved for transfer of a load between the loader and the vehicle and to lift or lower the load for transfer, at least one rotary load support arm mounted to describe a horizontal arc in and out over a path that the vehicle moves for transfer, vertical locating members depending from said loadspreader and support means pivotally connected to said loadspreader for supporting and turning said loadspreader to rotate horizontally to align for transfer, the improvement comprising: a plurality of parallel and depending free-swinging substantially vertical links spaced longitudinally along said support arm and connecting said support means to said support arm to form a parallelogram linkage to support said loadspreader to swing in and out lengthwise relative to said support arm and swing in when said loadspreader is brought against said vehicle to cushion against the vehicle and to allow the loadspreader to follow a chord across an arc along which transfer is made to closely align the loadspreader with the vehicle throughout the arc.

2. A loader as in claim 1, drive wheel means on said support arm adjacent said loadspreader for driving said loader in the arc for transfer, said support means having straight and opposite vertical sides parallel a plane of said free-swinging links, and low friction means on said support arm for engaging each of said straight sides at said drive wheel means to guide the support means as it swings on said links for taking drive forces between said support arm and said support means away from said links.

3. A loader as in claim 1 having a weight supported extending back on at least one of said links to extend the links forward so said loadspreader can swing through vertical positions of said links for better utilization of a swing movement of said links for least lift for said loadspreader relative to a horizontal distance that the links swing to the loadspreader.

4. A loader as in claim 1 having a substantially straight spring rod connected fixed to said loadspreader and extending substantially straight back and free through a hole on said support means to flex sideways to rotate the turntable loadspreader to realign the loadspreader after transfer to return the loadspreader to a position at right angles to said load support arm, said spring rod being free to move back and forth in said hole for said links to swing free.

5. A loader as in claim 1 said support means having a vertical column, said loadspreader comprising a plurality of support members mounted to turn on said column and extending radially therefrom to turn and align to support the load and to pivot together on said column to align the load with the vehicle.

6. In a loader as in claim 5, said support members being two under-reaching arms and a near-side alignment support all mounted to individually relatively rotate horizontally on said column to align with a load said arms being extended together to reach under the load, and means to engage the load to rotate apart said under-reaching arms to a position for holding the load in concert with said alignment support.

7. A loader as in claim 1, said support arm being connected by said links depending from said support means, the loader having a pivot post about which said loader is mounted to rotate and a lifting and lowering cam track concentric about said pivot post, said support arm having an inner and an outer end, wheel and leg means integrally depending from and supporting the outer end of said support arm on said cam track and an integral portion of said support arm depending from said inner end down to and including hinge means connecting said support arm to said pivot post for swinging vertically up and down from a point at near a same elevation as the cam track to keep wheel distance variation from said pivot post tolerable when said wheel and leg means is lifted and lowered by traveling around said cam track.

8. A loader having a loadspreader for extending under a semitrailer or vehicle from either side to lift it, said vehicle having a far side and a near side relative to said loader, said loadspreader having two under-reaching horizontally swinging arms for supporting the far side of the semitrailer and a near-side support for supporting under the near side of the semitrailer, means for rotating said arms toward each other to clear between end supports and obstructions under said semitrailer, and means for engaging the near side of the semitrailer to rotate apart said arms for supporting the far side of the semitrailer at points sufficiently spaced apart along the vehicle to support it with improved stability.

* * * * *